United States Patent [19]

Lindenfelser

[11] 4,319,819

[45] Mar. 16, 1982

[54] REFLEX SHUTTER

[75] Inventor: Jerome W. Lindenfelser, Brooklyn Park, Minn.

[73] Assignee: Photo Control Corporation, Crystal, Minn.

[21] Appl. No.: 121,385

[22] Filed: Feb. 14, 1980

[51] Int. Cl.³ .............................................. G03B 19/12
[52] U.S. Cl. ..................................... 354/154; 354/155
[58] Field of Search ................. 354/152, 153, 154, 155

[56] References Cited

U.S. PATENT DOCUMENTS

| | | | |
|---|---|---|---|
| 816,907 | 4/1906 | Garfield | 354/154 |
| 932,457 | 8/1909 | Folmer | 354/154 |
| 1,963,107 | 6/1934 | Walters | 354/154 |
| 2,225,351 | 12/1940 | Resk | 354/152 |
| 2,323,005 | 6/1943 | Bertele | 354/152 |
| 2,348,510 | 5/1944 | Aiken | 354/152 |
| 2,356,880 | 8/1944 | Pignone | 354/154 |
| 2,364,652 | 12/1944 | Pollock . | |
| 3,479,946 | 11/1969 | Bohm . | |

Primary Examiner—Russell E. Adams
Attorney, Agent, or Firm—James R. Haller

[57] ABSTRACT

A camera having shutter means for momentarily exposing film in a film plane to a light image from the camera lens. The shutter includes an arcuate shutter plate having an aperture therethrough aligned with the optical path of light through the lens, a mirror support bearing a mirror and mounted to the housing and pivotable between cocked and uncocked positions, the mirror support in its cocked position positioning the mirror between the aperture in the film plane to mask the film plane from the lens, and an arcuate masking plate mounted in the housing and swingable on the opposite side of the aperture plate from the mirror support between a cocked position out of alignment with the optical path and an uncocked position in the optical path and masking the aperture from the lens. The camera includes means urging the mirror support, and means urging the exterior masking plate, respectively, toward their uncocked positions.

4 Claims, 9 Drawing Figures

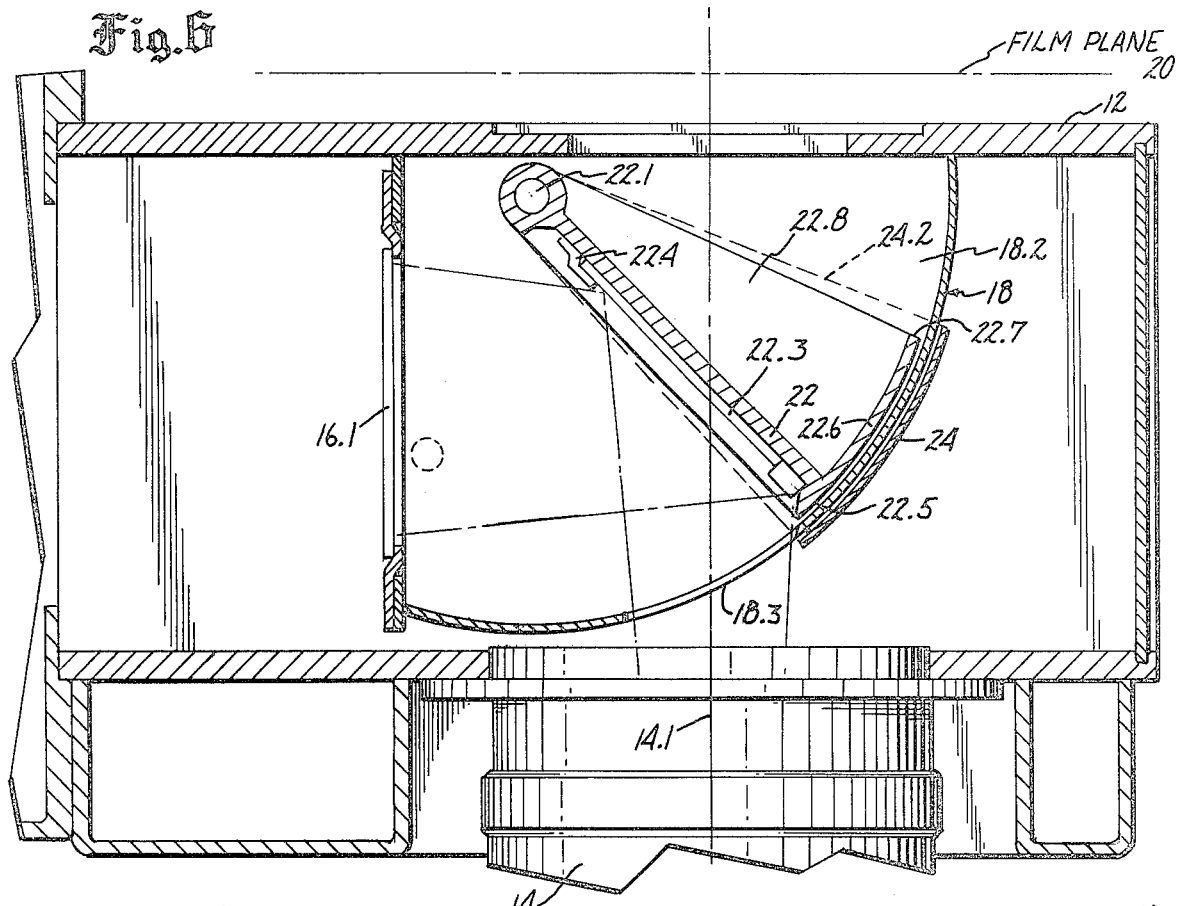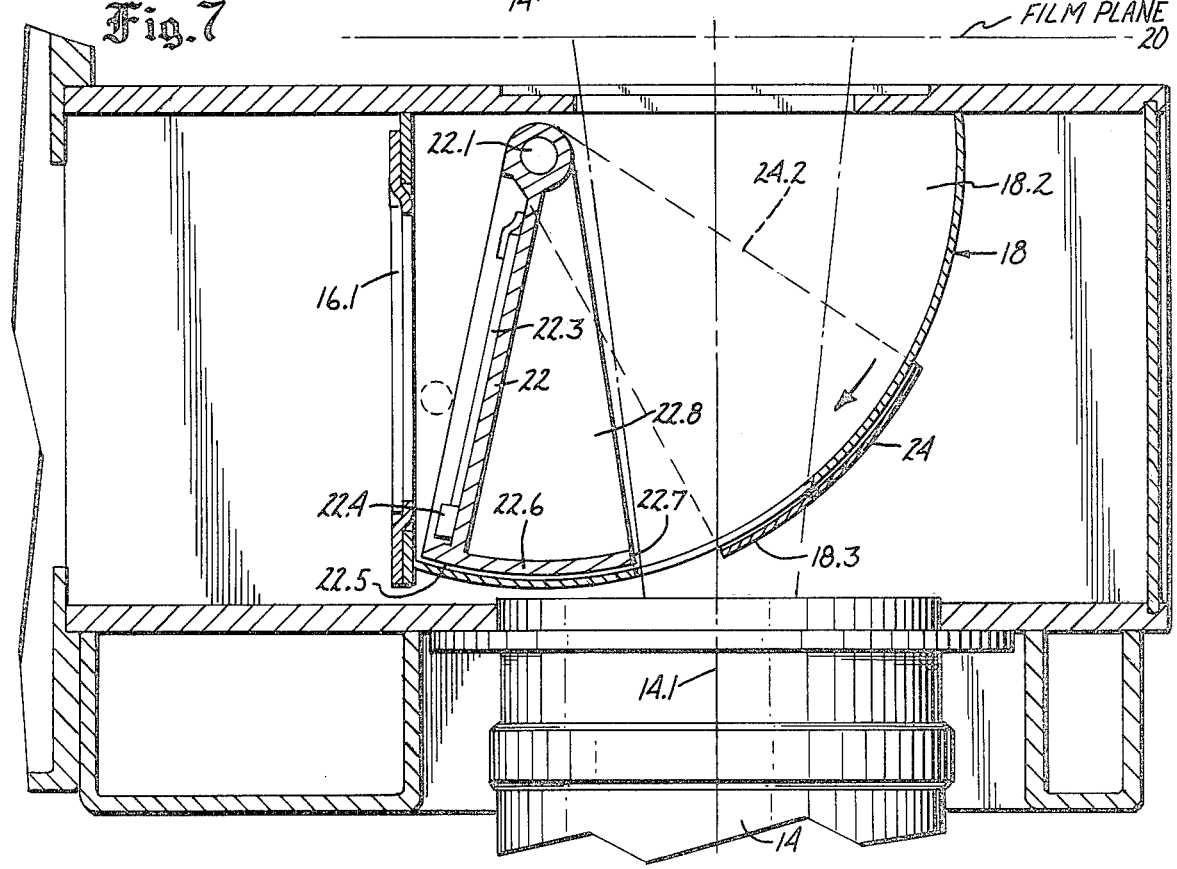

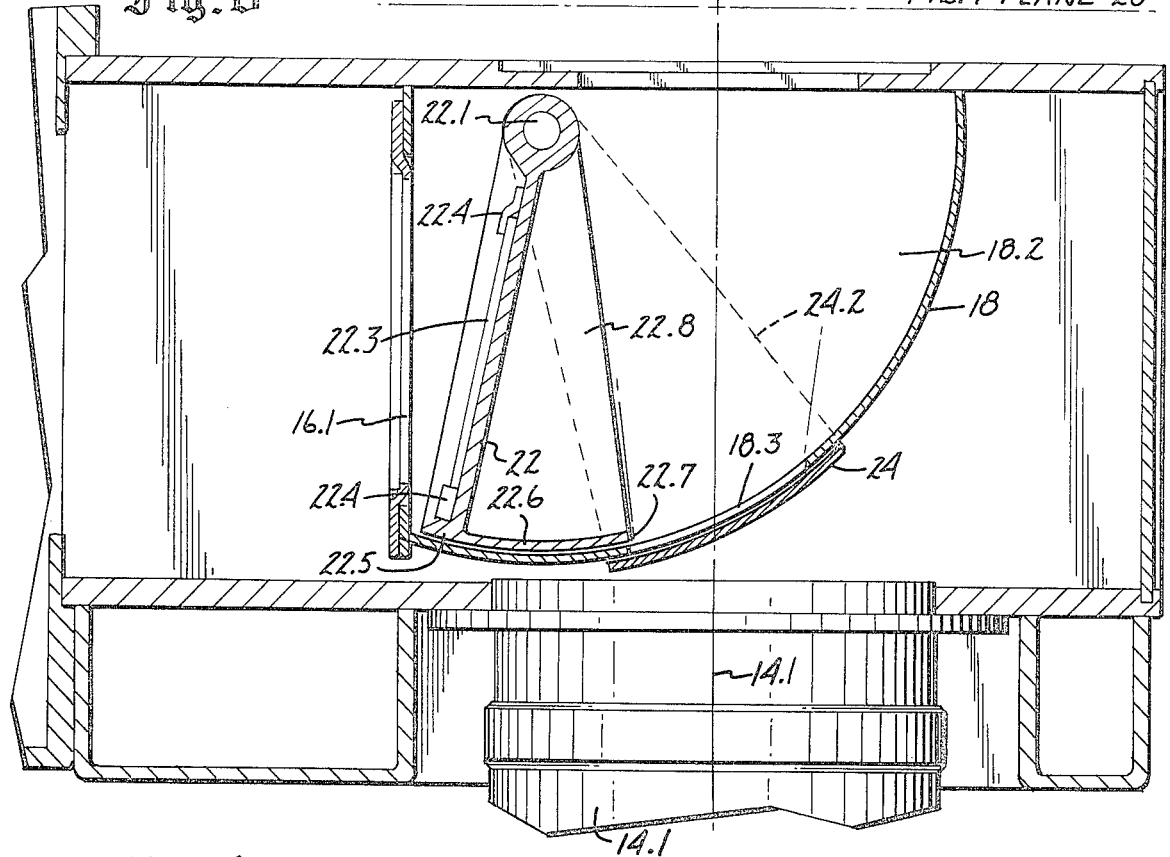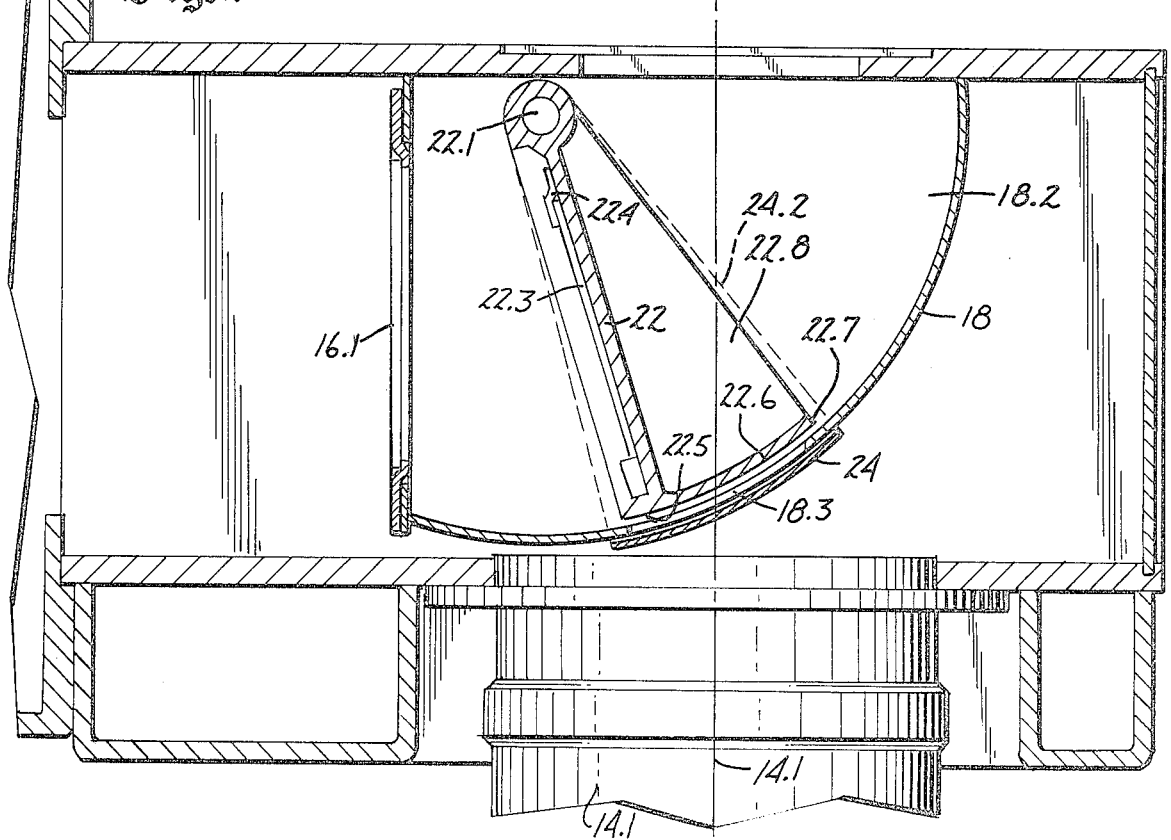

REFLEX SHUTTER

TECHNICAL FIELD

The invention relates to reflex-type cameras and to shutters for such cameras.

BACKGROUND ART

A through-the-lens reflex camera of the type currently marketed commonly empolys a swingable mirror to reflect an image onto a viewing screen. When the shutter is operated, the mirror is swung out of the optical path between the lens and film mounted in the film path to permit exposure of the film, but then returns quickly to its image-reflecting position. The shutter, although operating in connection with the swinging of the mirror, ordinarily is an independent element. In one embodiment, shown in U.S. Pat. No. 2,364,652, the swingable mirror operates as part of the shutter to open the latter as the mirror is swung out of the optical path. Through-the-lens lens reflex cameras in general operate rather noisily, and often a quite audible clicking sound can be heard as the swinging mirror abruptly contacts a stop during the instant that the shutter is open. This noise is particularly bothersome when portraits are taken. Portrait subjects often are quite tense, and the audible clicking produced by the mirror may cause a subject to blink or wince during the instant of time the camera shutter is open, giving rise to understandably poor portrait results.

Portrait cameras ordinarily are subjected to intense use, and accordingly it is further desired that such cameras be ruggedly built, and that the mechanism of such cameras be easily exposed for repair.

DISCLOSURE OF INVENTION

The instant invention relates to a photographic reflex camera having a housing bearing an objective lens and a viewfinder, and a film plane within the housing disposed in the optical path through the lens. The invention particularly relates to reflex cameras permitting the image of the subject to be viewed through the lens by the camera operator. The camera includes shutter means for momentarily exposing the film plane to a light image from the lens. The shutter means comprises an arcuate stationary shutter plate having an aperture therethrough aligned with the optical path to permit exposure of the film, and a mirror support bearing a mirror and mounted to the housing and pivotable between cocked and uncocked positions. The mirror support in its cocked position positions the mirror between the aperture and the film plane to mask the film plane from the lens. The shutter includes also an arcuate masking plate mounted to the housing and pivotable on the opposite side of the aperture plate from the mirror support between a cocked position out of alignment with the optical path and an uncocked position masking the aperture from the lens. Means are provided for respectively urging the mirror support and the exterior masking plate towards their uncocked positions. The camera includes release means for releasing the mirror support from its cocked position, and means for releasing the masking plate from its cocked position after release of the mirror plate but desirably prior to the time the latter reaches its uncocked position, thereby completing or nearly completing an exposure by the time the mirror support reaches its uncocked position and avoiding an audible click during the time the shutter is open.

The invention further relates to a reflex camera having a housing bearing an objective lens, a film plane within the housing disposed in the optical path through the lens, and a view finder. The camera includes a mirror support bearing a mirror and mounted to the housing and swingable between a cocked position in which the mirror is positioned in the optical path to reflect an image to the view finder, and an uncocked position out of the optical path. Means are provided to control the swinging movement of the mirror support, comprising rotating means, and linking means linking the rotating means to the mirror support to translate rotation of the rotating means to reciprocating swinging movement of the mirror support. The rotating means and linking means are so constructed and arranged as to cause the mirror support to attain its uncocked position as the rotating means rotates through a predetermined angle, thereby avoiding a sharp shock or bump which would occur should the mirror be stopped in its swinging movement from its cocked to its uncocked position by a fixed stop.

BRIEF DESCRIPTION OF DRAWINGS

FIG. 6 is a cross-sectional, broken-away top view of the camera of FIG. 1, showing the shutter mechanism in a given position;

FIG. 7 is a view similar to that of FIG. 6 but showing the shutter mechanism in a different position;

FIG. 8 is a view similar to that of FIGS. 6 and 7 but showing the shutter mechanism in a different position; and FIG. 9 is a view similar to that of FIGS. 6, 7 and 8, but showing the sutter mechanism in yet a different position.

BEST MODE FOR CARRYING OUT THE INVENTION

Figure 1:
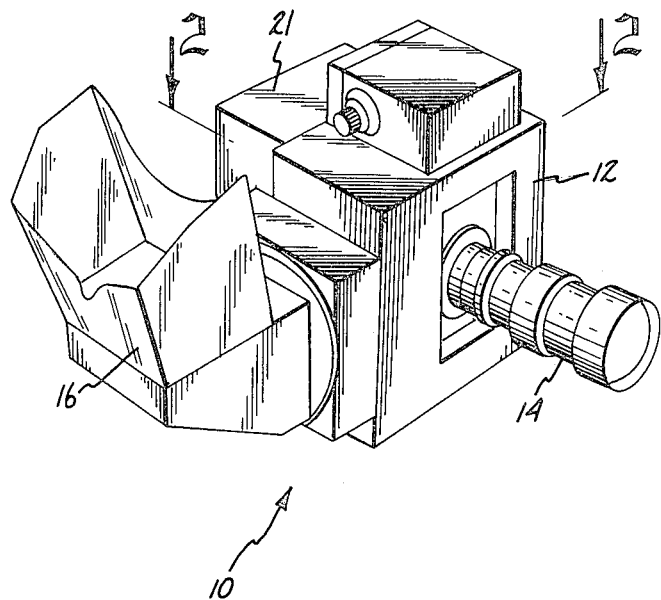
FIG. 1 is a perspective view of a camera of the invention.

Referring first to FIG. 1, a camera is designated generally as 10, and includes a housing (12), a lens (14) supported by the housing, and a viewfinder having a screen viewable through the viewfinder accessory (16) to permit the image seen through the lens to be viewed. As shown, the viewfinder accessory, which has a hood portion configured to fit snugly about the face of the viewer, may be rotated as desired.

Referring now to FIGS. 3 and 6-9, the camera is provided with an arcuate shutter plate (18), the shutter plate having top and bottom walls (18.1, 18.2) to form a compartment open at its back end toward a film plane (20) of the camera. As used herein, the terms "front", "forward" and the like refer to the front of the camera bearing the objective lens (14), and the terms "back", "rear", and "rearward" refer to the back of the camera which is opposite the front of the camera. The camera includes means for holding film in a film plane that is commonly perpendicular to the center line of the lens (14). The film-holding apparatus may be a separate film holder of known design that can be attached to the rear of the camera, or as shown at 21 in FIG. 1, unwind or windup rollers may be provided in known fashion to permit film from a storage roll to be advanced frame-by-frame into the film plane. The lens and film plane define an optical path that is normally coincident with the center line of the lens, the path being designated generally as 14.1 on the drawing. As shown best in FIGS. 3 and 6, the arcuate shutter plate is provided with aperture (18.3) that may be generally rectangular in shape, and the aperture plate is rigidly mounted to the housing with the aperture aligned with the optical path (14.1). With its top and bottom walls (18.1, 18.2), the shutter plate defines an enclosure opening rearwardly to the film plane (20) and opening forwardly through the aperture (14.1) to the objective lens (14).

With reference particularly to FIGS. 3 and 6-9, a plate-like mirror support (22) is disposed within the housing and is provided with a vertically extending axle (22.1) journaled into the bottom wall (18.2) of the shutter plate and having an upper portion (22.2) extending through and beyond the top wall (18.1). Attached to the mirror support (22) by clips or the like (22.4) is a mirror (22.3). The forward edge (22.5) of the mirror support is in close proximity to the inner surface of the arcuate shutter plate (18), and the mirror support desirably includes a vertically extending arcuate shield (22.6) having a sharp vertical edge (22.7). The mirror support may further be provided with top and bottom wall segments, of which the bottom segment is shown as 22.8 in FIG. 6-9, such segments lending rigidity to the mirror support (22) and arcuate shield (22.6). The mirror support is shown in its cocked position in FIG. 6, and in its uncocked position in FIGS. 7 and 8. When in its cocked position, the mirror support positions the mirror between the aperture (18.3) and the film plane (20) to mask or block the film plate from the lens (14) and to reflect a light image received through the lens to a viewing plate (16.1), the latter being viewable directly or through the viewfinder accessory (16) shown in FIG. 1.

A vertically extending, arcuate masking plate (24) is carried exteriorly of the arcuate shutter plate, as shown best in FIGS. 3 and 6-9, the masking plate having an inner concave surface confronting and matching closely the curvature of the exterior arcuate surface of the shutter plate. Top and bottom wall segments (24.1, 24.2) extend from the upper and lower edges of the masking plate (24), and are pivotally attached to the axle (22.1) of the mirror support so that the mirror support and masking plate may pivot or swing about the same vertical axis. The masking plate (24) is shown in its cocked position in FIG. 6 and in its uncocked position in FIGS. 8 and 9, the masking plate being out of the optical path when in its cocked position, but covering or masking the aperture (18.3) when in its uncocked position.

Figure 2:
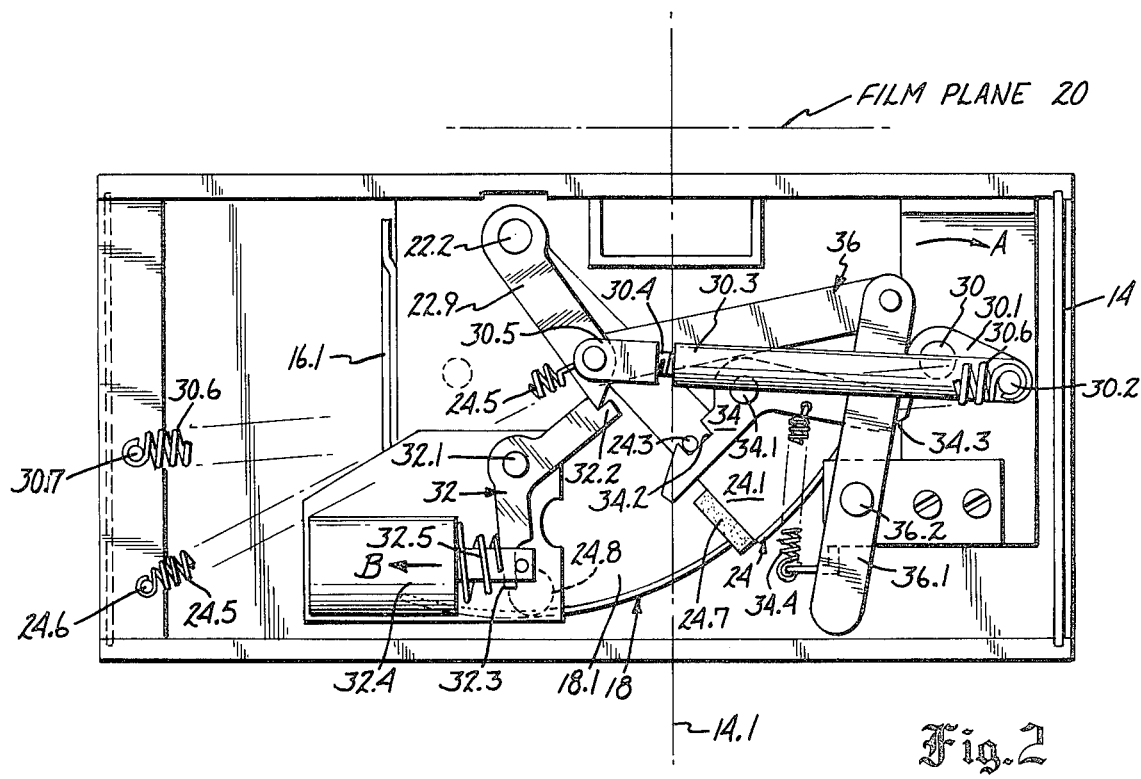
FIG. 2 is a cross-sectional view taken along line 2—2 of FIG. 1, parts of this figure being broken away.
Figure 3:
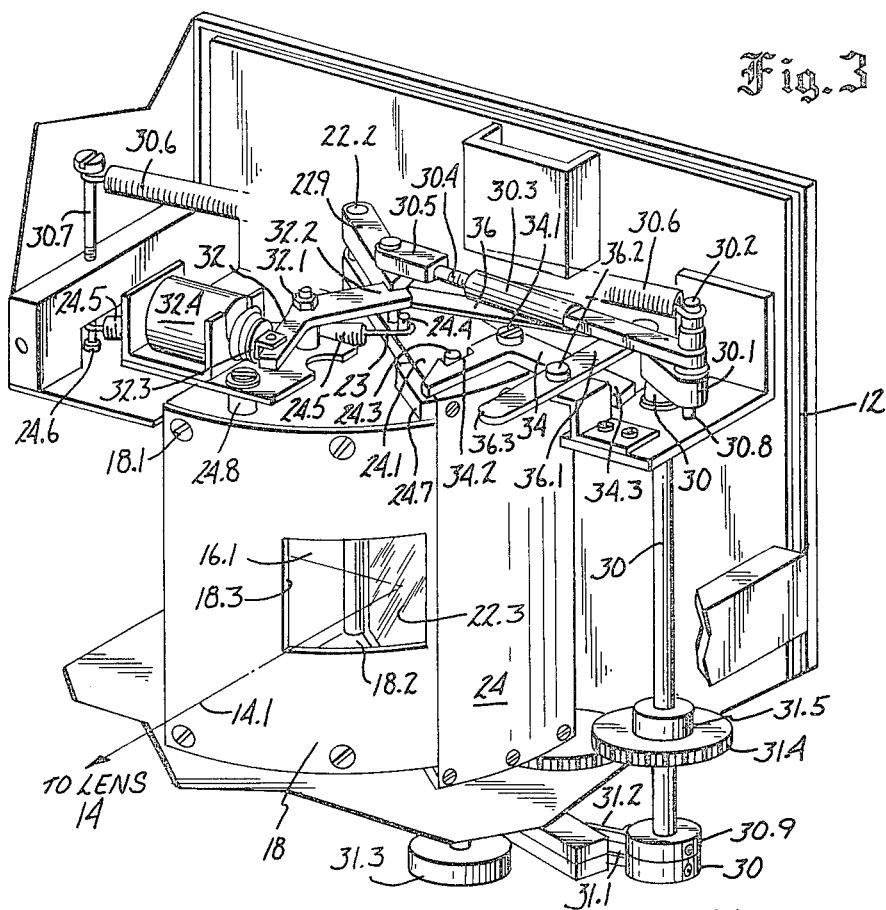
FIG. 3 is a broken-away, perspective view of the cameral of FIG. 1.

Referring now to FIGS. 2 and 3, a shaft (30), typifying rotary means, extends vertically within the camera housing and terminates at its upper end in a bell crank (30.1), the latter having an upwardly extending stub shaft (30.2) parallel to but spaced from the shaft (30). Pivotally attached to the stub shaft (30.2) is a link (30.3), the latter including a threaded coupling (30.4) to permit the length of the link to be adjusted as desired. A mirror support link (22.9) is rigidly fastened at one end to the top (22.2) of the axle (22.1), and at its other end pivotally attached to the free end (30.5) of the link (30.3) so that as the shaft (30) rotates about its axis in the direction shown by the arrow "A" in FIG. 2, the link (30.3) reciprocates, swinging the mirror support link (22.9) (and hence the mirror support (22) itself) about the axis of the axle (22.1). The latter swinging motion swings the mirror support (22) between the cocked and uncocked positions typified in FIGS. 6 and 7, respectively.

A helical spring (30.6) (shown broken away in FIGS. 2 and 3) extends between the stub shaft (30.2) and the frame (14), and is shown attached to the frame by pin (30.7). When the shaft (30) is rotated to the position shown in FIG. 2, which corresponds to the cocked position of the mirror support, the spring force urges the shaft to rotate in a clockwise direction to permit the mirror support to move toward its uncocked position. A release lever (32) is pivotally connected near its center at (32.1) to the housing, and one end (32.2) of the release lever is notched to releasably receive an end of the mirror support link (22.9). The other end of the release lever (32) is attached to the piston (32.3) of an electrically actuated solenoid (32.4), the latter being actuated by manually depressing a shutter button or the like at the exterior of the camera. When the solenoid is actuated, the piston (32.3) moves in the direction of the arrow "B", pivoting the lever (32) about its axis and releasing the end of the mirror support link (22.9), thereby permitting the mirror support link (22.9) (and mirror support (22)) to swing to the uncocked position. The solenoid spring (32.5) (FIG. 2) carried by the piston (32.3) serves to reset the piston.

A masking plate release lever (34) is pivotally mounted (at 34.1) near its center to the housing. One end of the lever (34) is provided with a notch (34.2) adapted to receive an upstanding pin (24.3) arising from the top wall segment (24.1) of the arcuate masking plate, the pin and notch cooperating to restrain the masking plate from moving from the cocked position shown in FIGS. 2 and 3. The other end of the release lever (34) is provided with an angled camming surface (34.3) adapted to be contacted by a downwardly extending portion (30.8) of the stub shaft (30.2), so that as the stub shaft revolves about the axis of shaft (30) in a clockwise direction, its downwardly extending portion (30.8) will contact and cam against the camming surface (34.3), causing the masking plate release lever to pivot in a counter clockwise direction (FIGS. 2 and 3) to thus release the pin (24.3) and to permit the masking plate (24) to swing to its uncocked position as shown in FIG. 8. It will be noted that the downwardly extending portion (30.8) contacts the camming surface (30.4) only after the former has revolved through a predetermined angle (e.g., about 90°–170°) from its cocked position.

A camming pin (24.4) also arises from the top wall segment (24.1) of the arcuate masking plate (24), and is connected by means of a helical spring (24.5) to the frame (at 24.6), the spring urging the arcuate masking plate to rotate in a clockwise direction as viewed in FIG. 2 toward its uncocked position. A cushion or pillow (24.7) of rubber or felt or other resilient material is provided at the leading edge of the top wall segment (24.1) of the arcuate masking plate, and is positioned to make contact with a fixed stop (24.8) mounted to the top wall (18.1) of the fixed arcuate shutter plate. As shown best in FIG. 2, a helical spring (34.4) extends between one arm of the masking plate release lever (34) and the housing to reset the lever (34) into the position shown in FIG. 2.

Extending downwardly from the mirror support link (22.9) is a camming pin (23) (FIG. 3) positioned to contact the camming pin (24.4) extending upwardly from the top wall segment of the masking plate to move the latter into a cocked position when the mirror support link (22.9) is rotated counterclockwise in the drawing to reset the mirror support in its cocked position.

The shaft (30) extends generally downwardly through the camera and terminates in a pair of coaxially mounted camming discs (30.9, 31), the rotary position of which is sensed by microswitch wands (31.1, 31.2). The shaft (30) is driven, solely in a clockwise direction as viewed in FIG. 2, by a small electric motor (31.3) that is energized in response to the position of the microswitch wands, as will be described more fully below.

The shaft (30) bears gears (31.4) at its lower end through which is is rotatably coupled to the motor (31.3) the gears including slip clutch means (31.5) permitting the shaft (30) to rotate freely in the clockwise direction as viewed in FIG. 2 but preventing rotation in the counterclockwise direction.

Also shown in FIGS. 2 and 3 is aperture linkage means, typified by pivotally connected links (36 and 36.1). The free end of link (36) is attached to and moves with the swinging end of the mirror support link (22.9). The link (36.1) is pivotallly attached intermediate its ends to the frame (at 36.2), and its free end (36.3) is provided with a camming surface that interacts with diaphram control means (not shown) for varying the diameter of the lens aperture. It will be understood that the lens aperture is maintained fully open when the mirror support is in its cocked position so as to permit a bright image to be viewed on the viewfinder screen (16.1). When the mirror support is released and swings to its uncocked position, the end (36.3) of the link (36.1) moves to adjust the diaphram control means to the desired diaphram opening.

Figure 4:
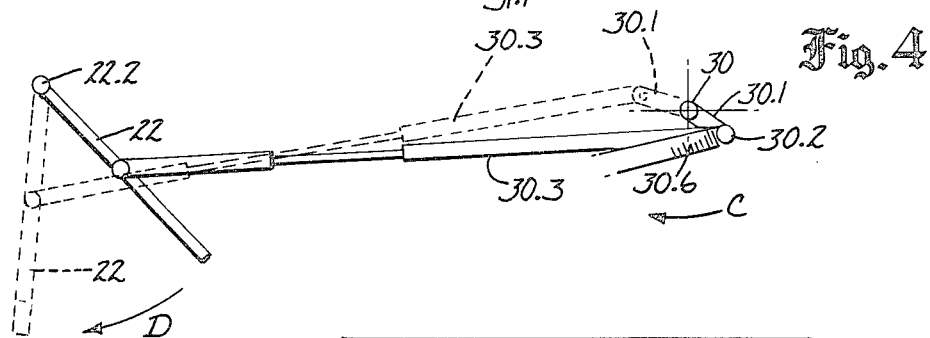
FIG. 4 is a diagramatic view showing a linkage mechanism employed in a camera of the invention.
Figure 5:
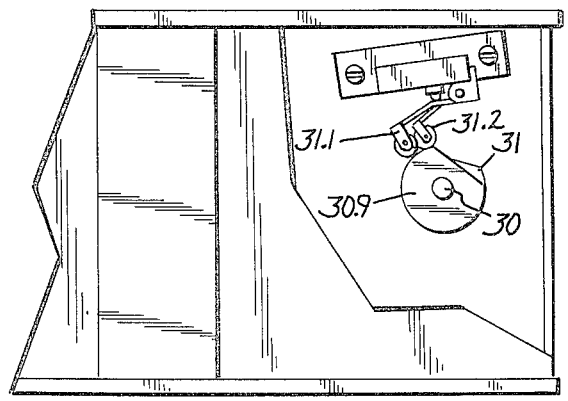
FIG. 5 is a broken-away view of a film-advancing and shutter-resetting mechanism, taken from the bottom of FIG. 1.

Referring now to FIG. 4, which diagrammatically shows the linkage between the shaft (30), bell crank (30.1), link (3.3) and the mirror support (22), the position of the linkage when the mirror support is in its cocked position is shown in solid lines, and the uncocked position is shown in phantom lines. As one complete picture-taking cycle occurs, the stub shaft (30.2) revolves clockwise in a complete circle about the shaft (30). When the mirror support is released from its cocked position (by actuation of the solenoid (32.4), the stub shaft rotates clockwise as shown by the arrow "C" in FIG. 4, the mirror support swinging toward the uncocked position as shown by the arrow "D". It will be understood that the swinging movement of the mirror support in a clockwise direction (to the right in FIG. 4) is very rapid. The mirror support reaches its position furthest to the right (FIG. 4) when the crank (30.1) and link (30.3) become aligned; the inertia of the system may, however, cause the linkage to travel slightly further and to come to rest in the position shown by dashed lines in FIG. 4. The linkage does not swing freely beyond the dashed line position because of the then resisting force of the spring (30.6). It will now be understood that the uncocked position of the mirror support need not be defined by the position of a stop or the like to be violently encountered by the mirror support; rather, the mirror support is eased into and through its uncocked position as the shaft (30), typifying rotating means, rotates through a predetermined angle to align the crank and link (30.1, 30.6).

Assuming the mirror support and masking plate to initially be in their cocked positions, as shown in FIGS. 2, 3 and 6, the light image from a subject is projected down the optical path through the lens, and is reflected by the mirror (22.3) to the viewfinder screen (16.1), whence it can be viewed through the viewfinder accessory (16). When a picture is to be taken, the solenoid (32.4) is actuated (as by pressing a button exteriorly of the camera). The solenoid piston (32.3) is retracted, pivoting the release lever (32) in a clockwise direction about its pivot point (32.1). Under the spring force of the helical spring (30.6), the mirror support link (22.9), now released from the end (32.2) of the release lever, swings in a clockwise direction to concurrently swing the mirror support (22) toward its uncocked position. Concurrently, the stub shaft (30.2) revolves clockwise about the axis of the shaft (30). The vertical edge (22.7) of the mirror support (22) swings past the aperture (18.3) to permit the light image through the lens to impinge upon film in the film plane. Before the mirror support (22) has reached its uncocked position, the downwardly extending portion (30.8) of the stub shaft (30.2) contacts the camming surface (34.3) of the release lever (34), causing the lever to pivot counterclockwise and release the pin (24.3) of the arcuate masking plate (24). The spring force of the spring (24.5) causes the arcuate masking plate (24) to swing counterclockwise to cover the aperture (18.3), the masking plate swinging through the position shown in FIG. 7 to that shown in FIG. 8. As the mirror support (22) swings through its uncocked position, the concurrent rotation of the shaft (30) rotates the cam discs (31, 30.9) to sequentially actuate the microswitch wands (31.2, 31.1). The latter energize the electric motor (31.3) to rotate the shaft (30) to reset the mirror support (22) and masking plate (24), and then shut the motor off. Note that the stub shaft (30.2), revolving clockwise against the pressure of the spring (30.6), passes slightly over the center of the axis of the shaft (30).

As the shaft (30) is rotated clockwise by the motor to reset the shutter, the mirror support link (22.9) pivots counterclockwise as shown in FIG. 2 to swing the mirror support (22) toward the position shown in FIG. 9. Continued clockwise rotation of the shaft (30) causes the camming pin (23) of the mirror support link (22.9) to engage the camming pin (24.4) of the masking plate (24), the latter thereupon being similarly swung in a counterclockwise direction toward its cocked position as shown in FIG. 6. The solenoid spring (32.5) and the masking plate release lever spring (34.4) respectively reset the positions of the release lever (32) and the masking plate release lever (34) into the position shown in FIGS. 2 and 3. Rotation of one of the cam discs (30.9, 31) also causes a new frame of film to be drawn into the film plane (20); or, a new plate of film may merely be inserted in the back of the camera.

It will be noted that the arcuate masking plate (24) begins to mask or cover the aperture (18.3) preferably prior to the instant that the mirror support (22) has reached its uncocked position. That is, exposure of the film has been substantially completed before any significant audible click resulting from uncocking of the mirror support (22) is heard by the subject. Further, the mirror support (22) itself, in a preferred embodiment, swings gently through its uncocked position and does not come to a jarring halt against a stop, thereby not only avoiding jolts or shocks which may tend to loosen mechanical components of the camera, but also reducing the noise generated during a photographic cycle. Moreover, the provision of a stationary, arcuate shutter plate with an aperture therethrough, a swingable mirror support swingable along the inner, concave surface of the arcuate shutter plate, and the further provision of an arcuate masking plate swingable along the outer or convex surface of the arcuate shutter plate, contribute to the ease with which the camera can be manufactured and also contribute to the light-tightness of the camera. Within limits, this feature permits certain tolerances to be relaxed and yet maintains light-tightness. Further, the positioning of the majority of the mechanical linkages outside of the light-tight inner compartment of the camera defined by the arcuate shutter plate, its top and bottom walls and the rear of the camera, permit the camera to be readily repaired or adjusted.

Many modifications are contemplated to the device of the invention. The mechanical linkage described above is typical of linkages which may be used with the invention. The electronic components of the camera, including the electric motor, solenoid and microswitches, are known to the art, and may be changed or modified as desired.

While a preferred embodiment of the present invention has been described, it should be understood that various changes, adaptations, and modifications may be made therein without departing from the spirit of the invention and the scope of the appended claims.

We claim:

1. In a photographic camera having a housing bearing an objective lens, a viewfinder and a film plane within the housing disposed on the optical path through the lens:

shutter means for momentarily exposing the film plane to a light image from the lens and comprising an arcuate, stationary shutter plate having an aperture therethrough aligned with the optical path, the arcuate shutter plate having a generally concave surface confronting the film plane and a generally convex surface confronting the objective lens;

a mirror support bearing a mirror and mounted to the housing but swingable along but spaced from the generally concave surface of the arcuate shutter plate between cocked and uncocked positions, the mirror support in its cocked position positioning the mirror between the aperture and the film plane to mask the film plane from the lens, and unmasking the film plane from the lens as the mirror support swings toward its uncocked position;

an arcuate masking plate mounted to the housing and having an inner generally concave surface confronting the exterior, generally convex surface of the shutter plate, the masking plate being swingable between a cocked position out of alignment with the optical path and an uncocked position masking the aperture from the lens; and means for sequentially releasing the mirror support and masking plate from their cocked positions to their uncocked positions, respectively to expose the film plane to a light image through the lens.

2. The camera of claim 1 in which the arcuate shutter plate is provided with an inner, concave surface and an outer, convex surface, the mirror support including an arcuate plate moveable along the inner concave surface of the shutter plate and the arcuate masking plate having an inner concave surface similar to and moveable exteriorly across the exterior convex surface of the shutter plate.

3. The camera of claim 1 including rotating means, linking means linking the rotating means to the mirror support to translate rotation of the rotating means to reciprocating swinging movement of the mirror support, the rotating means and linking means coacting to cause the mirror support to swing through its uncocked position as the rotating means rotates through a predetermined angle.

4. In a photographic camera having a housing bearing an objective lens, a view finder and a film plane within the housing disposed on the optical path through the lens:

shutter means for momentarily exposing the film plane to a light image from the lens and comprising;

an arcuate, stationary shutter plate having an aperture therethrough aligned with the optical path, the arcuate shutter plate having a generally concave surface confronting the film plane and a generally convex surface confronting the objective lens;

a mirror support bearing a mirror and mounted to the housing and swingable along but spaced from the generally concave surface of the arcuate shutter plate between cocked and uncocked positions, the mirror support in its cocked position positioning the mirror between the aperture and the film plane to mask the film plane from the lens, and the mirror in its uncocked position exposing the film plane to a light image through the aperture;

an arcuate masking plate mounted to the housing and having an inner, generally concave surface confronting the exterior, generally convex surface of the shutter plate, the masking plate being swingable between a cocked position out of alignment with the optical path and an uncocked position masking the aperture from the lens; and means for sequentially releasing the mirror support and masking plate from their cocked positions to their uncocked positions, respectively, said movement of the mirror support exposing the film plane to a light image to initiate a film exposure, such subsequent movement of the masking plate masking the aperture from the lens to complete such exposure.

* * * * *